Aug. 6, 1957

C. E. BRANSDOR 2,801,695

SCALE MECHANISM

Filed June 22, 1954

INVENTOR
CHESTER E. BRANSDOR

BY Emery Robinson
ATTORNEY

Aug. 6, 1957 C. E. BRANSDOR 2,801,695
SCALE MECHANISM

Filed June 22, 1954 2 Sheets-Sheet 2

INVENTOR
CHESTER E. BRANSDOR
BY Emery Robinson
ATTORNEY

United States Patent Office 2,801,695
Patented Aug. 6, 1957

2,801,695

SCALE MECHANISM

Chester E. Bransdor, Fox River Grove, Ill., assignor to Teletypesetter Corporation, Chicago, Ill., a corporation of Delaware Application June 22, 1954, Serial No. 438,473

1 Claim. (Cl. 164—112)

The present invention pertains to an improvement in keyboard perforators and counters and more particularly to scale mechanisms therefor.

The principal object of the invention is to provide means for accurately fixating the positionment of the index pointer relative to the scale.

Another object of the invention is to provide means for constantly subjecting a matrix pointer moving means to a constant torque to prevent inaccurate positionment of the pointer.

A further object of the invention is to provide in a scale mechanism, a matrix pointer drive means, whereby accurate pointer indications are invariably assured.

More specifically, in existing keyboard perforators and counters of the type disclosed in United States Patent No. 2,059,250, wear in the matrix pointer drive means has made it difficult to invariably attain accuracy in the indication of cumulative thicknesses of matrices comprising a justifiable line of type. The improvement according to the present invention for obviating this difficulty contemplates a combination compression and torsion spring which exerts its torsional effect on the adjusting collar and the gear hub which in turn causes the splines on the adjusting collar to be forced against one side of the splineways in the gear hub, thereby eliminating the gap on the leading side thereof, this gap being the difference between the dimensions of the splineway in the hub and the splines on the collar.

A better understanding of the invention may be had from the following description taken in conjunction with the accompanying drawings, wherein.

As is commonly known in the typographical art, the slugs or lines of type produced by composing machines of the linecasting type are made through the instrumentality of matrices which consist of small brass units carrying indented characters in their edges and which are of different thicknesses due to the fact that the characters vary in width. Thus, when these matrices are assembled into a line of predetermined definite length, the number of matrices necessary to complete the line varies with the particular matrices used. The length of the line, therefore, is dependent upon the thickness of the characters or matrices composing the line and not merely upon the number of characters included in the line. Hence it is necessary during the preparation of a perforated strip representing lines of composed matter for the production of the slugs or lines of type to totalize the various thicknesses of matrices corresponding to the code perforations made in the strip, so that the operator will be apprised of the length of the line remaining as each key is operated and can thus judge the justifiability of the line.

Figure 1:
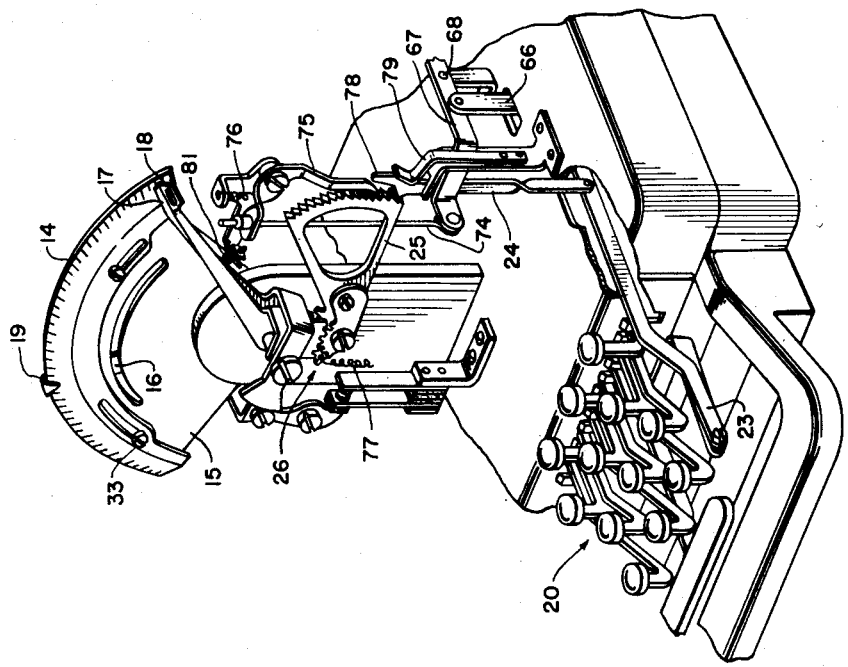
Fig. 1 is a fragmentary perspective view of a keyboard device employing the arrangement according to the present invention.

In the specific embodiment herein described, the present invention is shown in connection with the indicating device disclosed in the United States Patent No. 2,059,250 granted November 3, 1936 to H. L. Krum. The indicating mechanism therein described comprises a sectoral or fan-shaped dial 15, relatively movable to which are an index hand or matrix pointer 16 and a pair of spaceband pointers 17 and 18. The matrix pointer 16 is rendered variably movable along the arcuate edge of a scale 14 of dial 15 by means of a counting mechanism which is variably operated in accordance with the widths of the characters composed in the line, and which may be of the construction shown and described in said Patent No. 2,059,250. Briefly, the operation of the counting mechanism is controlled by a series of keys 20 (Fig. 1), arranged similarly to the familiar typewriter keyboard, through the instrumentality of a selector mechanism contained within the base of the keyboard devices.

Scale 14 is provided along its arcuate edge with a series of graduations, which in the present embodiment of the invention represent units of type measure. The length of line to be composed is predetermined and is represented by the distance between pointer 16, when it abuts adjustable stop 33 (Figs. 1 and 2), and the zero position on the scale. Thus, the adjustable stop 33 and the zero position on the scale cooperate to define the range of movement of the matrix pointer 16. The reverted end 19 of the matrix pointer 16 moves along the edge of the scale from left to right towards zero in response to the totalization or accumulation of the matrix or character thicknesses by the counting mechanism.

As disclosed in said Patent No. 2,059,250, the spaceband pointers 17 and 18 cooperate with the matrix pointer 16 to indicate the justifiability of the composed line. The movement of pointers 17 and 18 are controlled in the manner described in said Patent No. 2,059,250 by the space key 23 through the instrumentality of pawl and ratchet means 24—25 and gear segments indicated generally by the numeric 26. Since the present invention is concerned primarily with the matrix pointer movement, it is only briefly set forth herein that upon each actuation of the space key, the spaceband pointers 17 and 18 are moved proportionately so that the distance between the pointers 17 and 18 is indicative of the cumulative expansibility of the spacebands in the line, and a line is deemed to be justifiable when the matrix pointer 16 is presented between the pointers 17 and 18. However, as will presently appear, the invariably accurate positionment of the matrix point 16 upon each actuation, which is very essential in determining justifiability of the line, is facilitated by the present invention.

Figure 2:
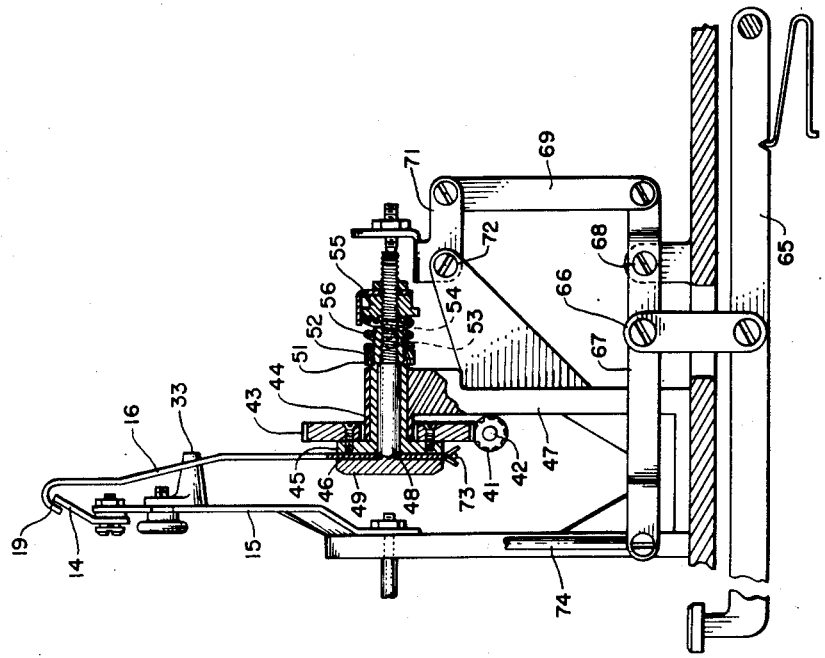
Fig. 2 is a vertical cross-sectional view of the indicating mechanism.

Having reference to Fig. 2, a worm gear 41 is fixed to a shaft 42 which extends to and derives its rotation from the counting mechanism described in the aforesaid Patent No. 2,059,250, which is incorporated by reference herein. Worm gear 41 is meshed with a gear 43. Thus, the rotation of gear 43 is variably controlled by the counting mechanism of Patent No. 2,059,250, and the rotation thereof in varying amounts is transmitted through a sleeve 44 to which gear 43 is fastened, to the index hand 16. More specifically, sleeve 44 is provided with a flange 45 to which the gear 43 is attached by means of screws 46. Sleeve 44 is rotatably mounted in a bracket 47, and threaded axially through sleeve 44 is a rod 48. The left extremity of rod 48, as viewed in Fig. 2, is provided with an integral disc 49, and the opposite end thereof has a threaded portion.

The bearing portion of sleeve 44, which is of slightly greater diameter than the threaded portion, is held relatively in bracket 47 by means of a washer 51 and a nut 52 applied to the threaded portion of sleeve 44. The threaded end of sleeve 44 is provided with a pair of splineways 53 adapted to receive a pair of splines 54 integral with a threaded nut-like member or thimble 55 carried adjustably on the threaded end of the rod portion 48. Encircling the sleeve 44 and positioned between nut 52 and thimble 55 is a combination compression and torsion spring 56. The compressive force of spring 56 is utilized to effectively clamp the matrix pointer 16 between the flanges 45 and 49, and the torsional force of spring 56 is utilized, in a manner which will hereinafter appear, to insure invariably the accurate positionment or fixation of the matrix pointer 16 pursuant to each actuation of the counting mechanism.

Figure 3:
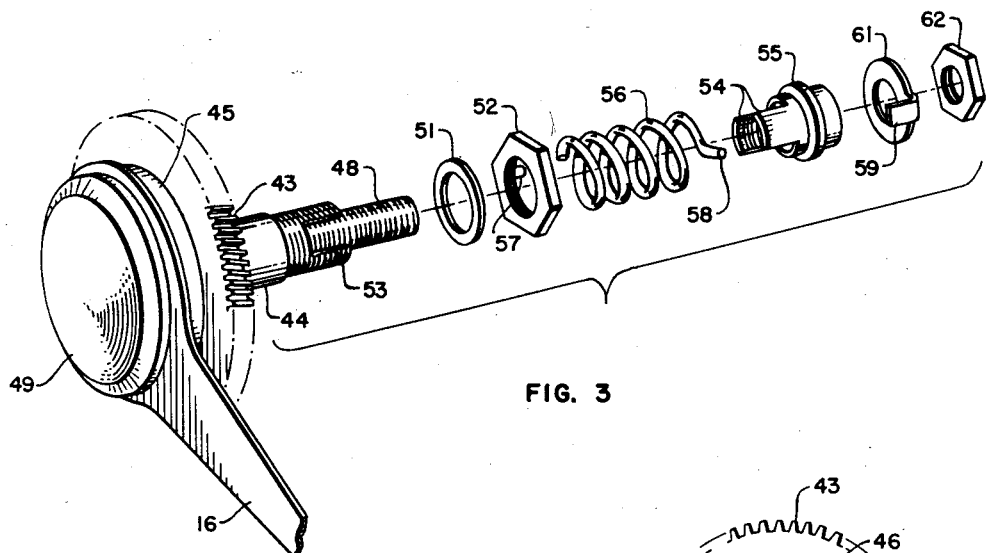
Fig. 3 is an exploded perspective view of the matrix pointer drive mechanism.
Figure 5:
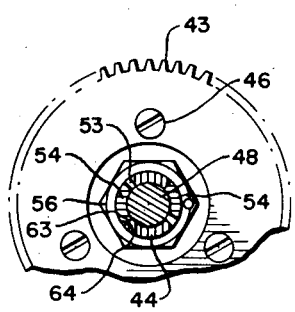
Fig. 5 is a cross-sectional view taken on line 5—5 of Fig. 4.
Figure 4:
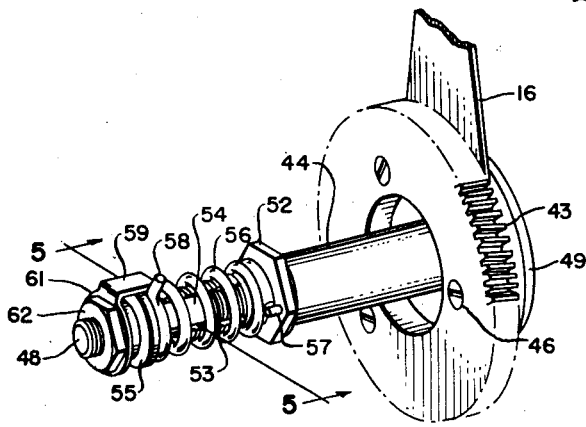
Fig. 4 is a perspective view of the matrix pointer assembly.

As viewed in Figs. 3 and 4, the nut 52 is provided with a stud 57 adapted to cooperate with one end of the spring 56. The other end 58 of the spring 56 is conformed to cooperate with a stop projection 59 formed on an annular stop member 61 adapted to fit over the end of rod 48 and bear against the thimble 55. A lock nut 62 is carried on the threaded end of rod 48 and is adapted to securely lock or clamp the stop member 61 into place after the desired compression of spring 56 has been established by turning member 55 (which is internally threaded) on the rod 48. The torsional force of spring 56 is utilized to hold the leading side or edge 63 (Fig. 5) of each of the splines 54 constantly against the confronting side 64 of the respective splineway 53, thereby taking up any play which may occur due to manufacture and/or wear. In this manner, the leading edge 63 of the spline 54 is constantly constrained by spring 56 to bear against the edge 64 of the splineway 53. Thus, the matrix pointer assembly shown in Fig. 4, functions as a unit, wherein all the lost motion and/or play due to loose fits have been eliminated, thereby assuring accurate matrix width totalizations.

To achieve a self-tightening effect between members 52 and 55 and their respective members 44 and 48, the said members 44 and 48 are reversely threaded; for example, the thread on sleeve 44 is a right-hand thread, so that as the spring 56 coacts with stud 57 to rotate the nut 52 clockwise (as viewed in Fig. 4), the nut 52 constantly tends to impart a tightening effect against the shoulder of the bearing portion of sleeve 44. Also, the thread on the rod 48 is a left-hand thread, so that as the spring 56, through its projection 58, coacts with the projection 59 on the stop member 61, a constant tightening effect is imparted to the nut 62. Of course, the helical directions of threads and spring may be varied relatively to each other without departing from the spirit of the invention.

As previously mentioned, the arrival of the matrix pointer 16 at any point between pointers 17 and 18 is indicative of the fact that the composed line is justifiable or is within the range of automatic justification by the linecasting machine. To effect the return of pointers 16, 17 and 18 to their original or initial positions, the carriage return or "elevator" key is depressed to operate the keylever 65 (Fig. 2). Keylever 65 when operated imparts a downward movement to link 66 to cause lever 67 to rotate in a counterclockwise direction about its pivot 68 and simultaneously to impart an upward movement to link 69, which in turn rotates bell crank 71 in a counterclockwise direction about pivot 72 to cause rod 48 to move to the left against the action of spring 56 to disable the clamping effect of disc 49 upon the matrix pointer 16 and permit pointer 16 to be returned to its initial position against the adjustable abutment 33 by a spring (not shown) acting on a cord 73.

Also, pivotally attached to lever 67 is the rod 74, the downward movement of which simultaneously with link 66 causes the holding pawl 75 (Fig. 1) to be rotated in a counterclockwise direction against the action of spring 76 out of engagement with ratchet 25 and simultaneously to coact with extension 78 of pawl 24 to effect the disengagement thereof against the urge of spring 79. The ratchet 25 thus is free to respond to the pull of spring 77 to be returned in a counterclockwise direction to its initial position, at the same time effecting the return of pointers 17 and 18 to their initial position against the adjustable stop 81. It is obvious, therefore, that upon the completion of a line of composition the "elevator" key is depressed which through the keylever 65 effects simultaneously the return of not only the matrix pointer 16 but also the spaceband pointers 17 and 18 to their initial or "beginning-of-line" positions.

It is manifest from the foregoing description that a device has been provided which renders positionment of the index or matrix pointer invariably accurate. Various changes and modifications may be made without departing from the spirit and scope of the invention.

What is claimed is:

In combination, a keyboard device having a series of keys corresponding to a series of characters, an indicating device having a dial, an index pointer movable over said dial, driving means for said pointer, means effective upon the depression of a key to operate said pointer an amount predetermined by the particular key depressed, pointer return means, clamping means for governing the movement of said pointer by said driving means, said clamping means comprising a pair of interengaging instrumentalities, one of said pair having a plurality of splines and the other of said pair provided with a corresponding plurality of splineways, means including a reciprocable element for intermittently rendering said clamping means ineffectual to govern the movement of said pointer to thereby render said pointer return means effective, coiled compression spring means cooperable through said reciprocable element with said clamping means, and facilities cooperably associated with said instrumentalities, said facilities having abuttal relation with the coil extremities of said spring means to create under predetermined operating conditions a torsional stress in said spring means without impairing the compressive force therein, whereby said spring means through the abuttal relation between said facilities and said coil extremities is constantly effective upon said splines and splineways to fixate each adjusted positionment of said index pointer under the control of said driving means thereby assuring the constant elimination of play between said spline means and said splineways, said spring means simultaneously operative through its expansive force to render said clamping means effective.

References Cited in the file of this patent

UNITED STATES PATENTS

| 1,430,274 | Alger | Sept. 26, 1922 |
| 1,884,029 | Luyks | Oct. 25, 1932 |
| 2,059,250 | Krum | Nov. 3, 1936 |
| 2,294,385 | Colman | Sept. 1, 1942 |